(12) United States Patent
Fick et al.

(10) Patent No.: US 10,980,226 B2
(45) Date of Patent: Apr. 20, 2021

(54) GOOSE DECOY WITH HEAD AND TAIL MOVEMENT

(71) Applicant: WiSys Technology Foundation, Inc., Madison, WI (US)

(72) Inventors: John Fick, Menasha, WI (US); Jose Alvarez, Janesville, WI (US); Sam Hanson, Marengo, WI (US); Scott Schnering, Cassville, WI (US); Joseph Stoffel, West Bend, WI (US); Robert Welsh, Sun Prairie, WI (US); Kevin Duban, Salem, WI (US); Karl Goetsch, Lake Mills, WI (US); Adam Hunger, Waukesha, WI (US); Connor Olson, Platteville, WI (US); Will Peckham, Richland Center, WI (US)

( * ) Notice: Subject to any disclaimer, the term of this patent is extended or adjusted under 35 U.S.C. 154(b) by 197 days.

(21) Appl. No.: 16/225,750

(22) Filed: Dec. 19, 2018

(65) Prior Publication Data

US 2019/0183112 A1     Jun. 20, 2019

Related U.S. Application Data

(60) Provisional application No. 62/607,384, filed on Dec. 19, 2017, provisional application No. 62/618,251, filed on Jan. 17, 2018.

(51) Int. Cl.
*A01M 31/06*     (2006.01)
*G08C 17/02*     (2006.01)

(52) U.S. Cl.
CPC .............. *A01M 31/06* (2013.01); *G08C 17/02* (2013.01); *G08C 2201/10* (2013.01)

(58) Field of Classification Search
CPC .................................................... A01M 31/06

USPC .................................. 43/2, 3; 446/382–384
See application file for complete search history.

(56) References Cited

U.S. PATENT DOCUMENTS

| | | | | | |
|---|---|---|---|---|---|
| 2,545,800 A | * | 3/1951 | Viken | ................... | A01M 31/06 43/3 |
| 5,152,692 A | * | 10/1992 | Richards | ................ | G09B 23/32 434/267 |
| 5,259,765 A | * | 11/1993 | Richards | ................ | G09B 23/32 434/267 |
| 5,279,063 A | * | 1/1994 | Heiges | ................... | A01M 31/06 43/3 |
| 5,289,654 A | * | 3/1994 | Denny | ................... | A01M 31/06 43/2 |
| 5,375,363 A | * | 12/1994 | Higdon | ................. | A01M 31/06 43/3 |

(Continued)

*Primary Examiner* — Peter M Poon
*Assistant Examiner* — Danielle A Clerkley
(74) *Attorney, Agent, or Firm* — Boyle Fredrickson S.C.

(57) ABSTRACT

A moving decoy that better captures the natural movements of a goose or similar game bird in critical aspects, most notably, the characteristic, highly flexible goose neck and the wagging of the tail is provided. The invention provides an improved set of neck vertebrae for use in this application and may operate as integrated into the rest of the decoy or as a modular neck modular neck may be attached to a variety of different decoys. Actuation of the neck may be provided by self-contained electrical motor and power unit in the latter case. In an alternative embodiment remote access of the neck may be provided by cables run between the decoy and a remote location.

20 Claims, 7 Drawing Sheets

(56) References Cited

U.S. PATENT DOCUMENTS

| | | | | |
|---|---|---|---|---|
| 5,613,317 A | * | 3/1997 | Ninegar | A01M 31/06 43/3 |
| 5,964,055 A | * | 10/1999 | Smith | A01M 31/06 43/3 |
| 6,684,552 B1 | * | 2/2004 | Anders, III | A01M 31/04 43/2 |
| 9,538,744 B1 | * | 1/2017 | Campbell | G05B 15/02 |
| 2014/0338249 A1 | * | 11/2014 | Heiges | A01M 31/06 43/3 |

* cited by examiner

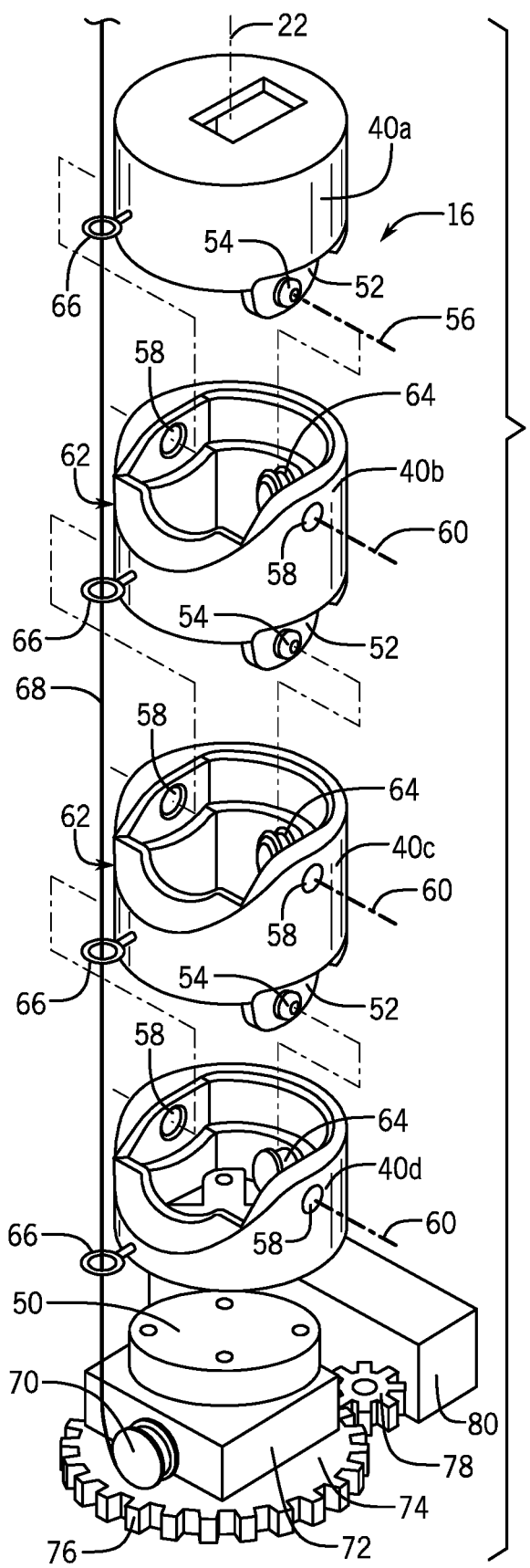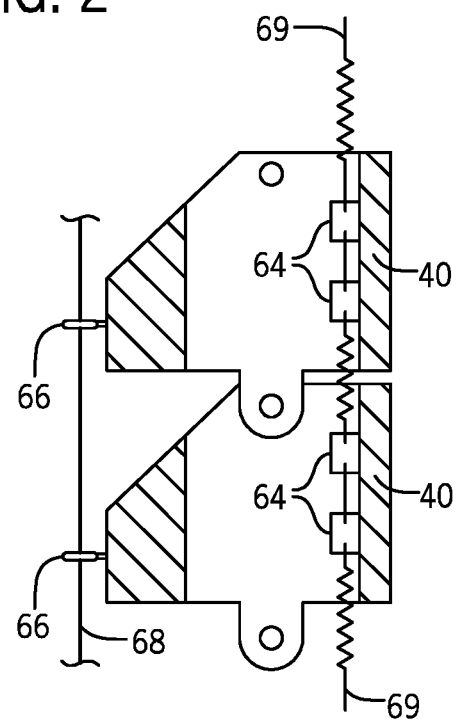
FIG. 2
FIG. 3

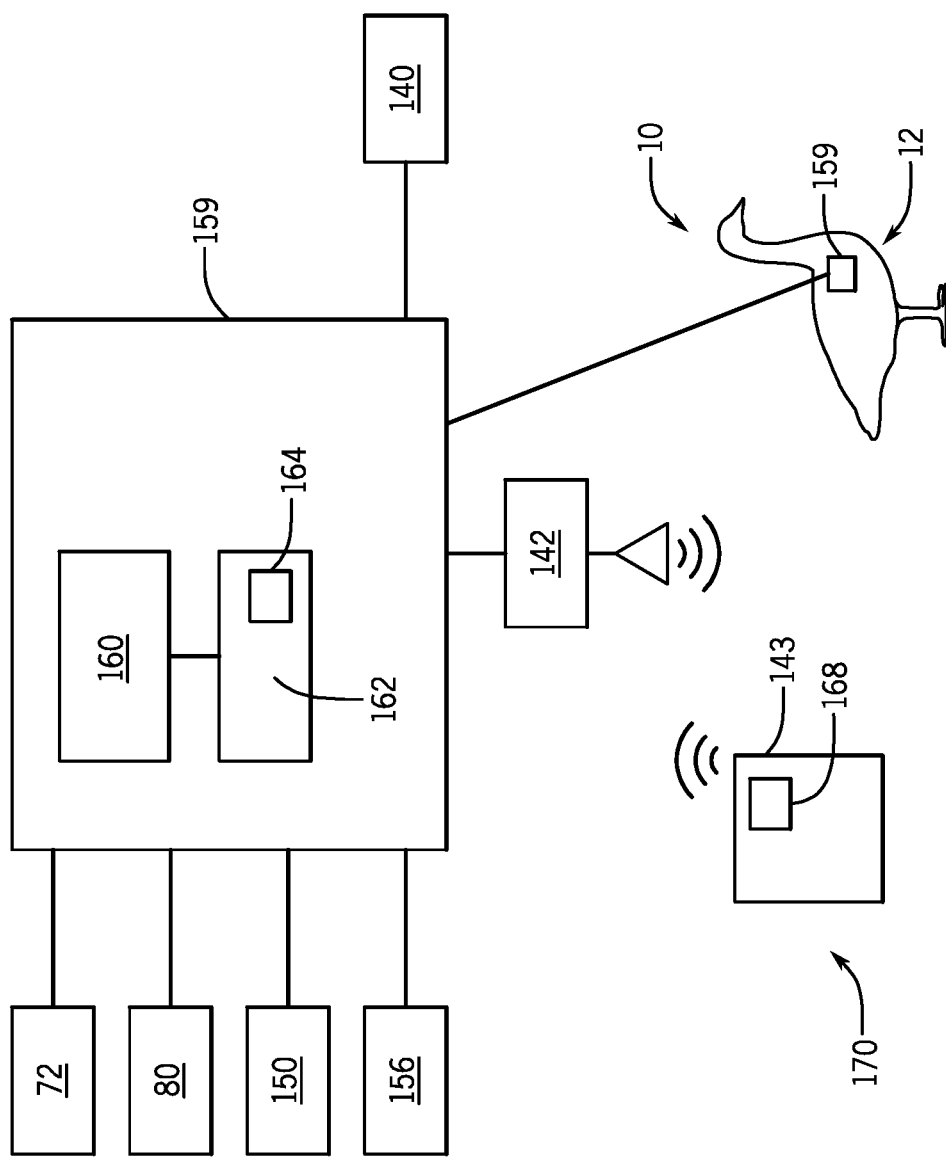

GOOSE DECOY WITH HEAD AND TAIL MOVEMENT

CROSS REFERENCE TO RELATED APPLICATION

This application claims the benefit of U.S. Provisional Application No. 40/607,384, filed Dec. 19, 2017 and U.S. Provisional Application No. 40/618,251, filed Jan. 17, 2018, both of which are hereby incorporated by reference.

STATEMENT REGARDING FEDERALLY SPONSORED RESEARCH OR DEVELOPMENT

--

BACKGROUND OF THE INVENTION

The present invention relates to goose decoys, and in particular, to a goose decoy with natural neck and tail movement.

Hunting decoys are devices used for hunting wildfowl. For example, the hunting decoys are placed about the hunting area to encourage wild birds to land nearby and within the range of a nearby concealed hunter.

Types of decoys for wildfowl may include simple silhouette decoys that are two-dimensional representations of geese or three-dimensional life-size models of geese that are meant to simulate the presence of geese. The three-dimensional models are preferred over the two-dimensional models as they better simulate the illusion of geese and are often shells made out of wood, cork, canvas and plastic materials.

More modern day decoys also provide motion to better simulate life-like motion of geese. The decoys may use battery powered motors to move or rotate the various anatomical parts of the geese.

While the motion may enhance the life-like quality of the decoys, poorly implemented movement can scare away wildfowl and provide the opposite desired effect.

SUMMARY OF THE INVENTION

The present invention provides a goose decoy that captures the natural movements of a goose or similar game bird in critical aspects, most notably, the characteristic, highly flexible goose neck and the wagging of the tail.

The present invention provides an improved set of neck vertebrae for use in this application and may operate as integrated into the neck of the decoy, or as a removable modular neck that can be attached to a variety of different decoy bodies. Actuation of the neck may be provided by a self-contained electrical motor and power unit in the latter case. In an alternative embodiment, remote access of the neck may be provided by cables run between the decoy and a remote location.

The invention further provides an improved tail portion for use in this application and may operate to move the tail in both horizontal and vertical directions. The tail is sealed with a ball-type joint preventing ingress of environmental contaminants such as dirt and moisture into the decoy body from the environment.

In one embodiment of the present invention a game bird decoy is provided having a body element having a flexible neck element extending therefrom, the body element and flexible neck element sized and decorated to resemble a bird wherein the flexible neck element includes a stack of inter-engaging neck segments extending along a neck axis, each of said neck segments pivotally attached to an adjacent neck segment of said stack of neck segments to provide a limited pivoting with respect to the adjacent neck segment to curve forward along the neck axis; at least one restoring spring urging the neck segments into a resting alignment; a tension band attached to each inter-engaging neck segments and extending along the stack of neck segments to follow any curvature of the neck segments; wherein each inter-engaging neck segment has two outwardly extending pins extending coaxial along an axis generally perpendicular to the neck axis, and wherein the outwardly extending pins fit within corresponding bore holes positioned along the axis on opposite sides of an upper end of each inter-engaging neck segment by a snap fit allowing simple interconnection of the stack of inter-engaging neck segments.

It is thus a feature of at least one embodiment of the invention to provide quick and easy snap connection of a stack of interengaging neck segments that allow for curvature of the neck along a neck axis.

Each inter-engaging neck segments may be a single piece thermoplastic element.

It is thus a feature of at least one embodiment of the invention to allow each of the inter-engaging neck segments to be identically molded.

Each inter-engaging neck segment may have downwardly extending interconnection tabs on opposite sides of a lower end of each neck segment.

It is thus a feature of at least one embodiment of the invention to provide snap fit of adjacent neck segments that also provides clearance for pivoting motion.

Each inter-engaging neck segment may include a chamfer at a front upper edge allowing the segments to flex from the neck axis by more than 20°. The flexing is forward with respect to the anatomical decoration.

It is thus a feature of at least one embodiment of the invention to provide for realistic bending of the neck and articulation along an entire length of the neck.

Each inter-engaging neck segment may provide a central channel providing a guide for receiving the tension band for sliding therethrough.

It is thus a feature of at least one embodiment of the invention to allow for adjustable tensioning along the neck segments at one end of the neck segments opposite a restoring spring.

The tension band guide may be a notch on an interior of the inter-engaging neck segment and receiving the tension band therein to couple the tension band to each inter-engaging neck segment. The notch may be formed on an inner edge of the chamfer.

It is thus a feature of at least one embodiment of the invention to couple each neck segment to the tension band without having to individually thread the tension band, and where the tension band is further protected by the neck segment from contact with the outer flexible covering of the decoy.

The central channel may provide attachment points for the at least one restoring spring.

It is thus a feature of at least one embodiment of the invention to protect the restoring spring within an internal channel of each neck segment, also protected by the neck segment from contact with the outer flexible covering of the decoy.

The outwardly extending pin may be a semispherical protrusion with a slanted cutaway forming a downwardly extending sloping surface. The outwardly extending pin may have a second slanted cutaway forming an upwardly extending sloping surface.

It is thus a feature of at least one embodiment of the invention to allow the outwardly extending pin to more easily snap into a corresponding bore hole while still remaining securely connected.

A lower neck segment is supported by a base including a servo-motor receiving the tension band to apply tension to the tension band to controllably curve the flexible neck element.

It is thus a feature of at least one embodiment of the invention to allow the neck movements to be motor actuated by remote control.

The base may include a second servo-motor communicating with a lower neck segment to rotate the stack of inter-engaging neck segments about the neck axis. A swivel mechanism is coupled to the base and is actuated by a second servo-motor.

It is thus a feature of at least one embodiment of the invention to provide rotation of the neck separate from the curvature of the neck element.

A tail element may extend from the body element and includes a strut extending along a tail axis. The tail element may include a servo-motor receiving the strut and moving the strut in at least one direction. The strut may move in at least two perpendicular directions.

It is thus a feature of at least one embodiment of the invention to provide realistic movement of the tail element by articulating it in multiple directions.

In another embodiment of the present invention a flexible neck for a game bird decoy is provided comprising: a connector half adapted to be received by a corresponding connector half on a game bird decoy body to be removably attached to the game bird decoy body; a flexible neck attached to the connector half the flexible neck element sized and decorated to resemble a bird wherein the flexible neck element includes a stack of inter-engaging neck segments extending along a neck axis, each of said neck segments pivotally attached to an adjacent neck segment of said stack of neck segments to provide a limited pivoting with respect to the adjacent neck segment to curve forward along the neck axis, the flexible neck element including at least one restoring spring urging the neck segments into a resting alignment, wherein the resting alignment defines the neck axis; a cable attached to each inter-engaging neck segments and extending along the stack of neck segments to follow any curvature of the neck axis; and a servo-motor receiving the tension band to apply tension to the cable to controllably curve the flexible neck element.

It is thus a feature of at least one embodiment of the invention to allow the neck segment to be separately purchased and replaced from the rest of the body.

The flexible neck element may further include an electronic computer executing a stored program to control the servo-motor to provide for controlled bending of the neck axis; and a power supply supplying power to the servo-motor. The flexible neck element may further include a wireless communication device communicating with the electronic computer for synchronizing operation of the servo-motor of the game bird decoy. The power supply may be a battery.

It is thus a feature of at least one embodiment of the invention to contain the more expensive electronics of the into a single replaceable element.

In another embodiment of the present invention a method of using a game bird decoy is provided including the steps of providing a game bird decoy having a body element having a flexible neck element extending therefrom, the body element and flexible neck element sized and decorated to resemble a bird wherein the flexible neck element includes a stack of inter-engaging neck segments extending along a neck axis, each of said neck segments pivotally attached to an adjacent neck segment of said stack of neck segments to provide a limited pivoting with respect to the adjacent neck segment to curve forward along the neck axis; at least one restoring spring urging the neck segments into a resting alignment, wherein the resting alignment defines the neck axis; a tension band attached to each inter-engaging neck segments and extending along the stack of neck segments to follow any curvature of the neck axis; where each inter-engaging neck segment has two downwardly extending interconnection tabs on opposite sides of a lower end of each inter-engaging neck segment and having outwardly extending pins extending coaxial along an axis generally perpendicular to the neck axis, and where the outwardly extending pins fit within corresponding bore holes positioned along the axis on opposite sides of an upper end of each inter-engaging neck segment by a snap fit allowing simple interconnection of the stack of inter-engaging neck segments; and applying a tension to the tension band to controllably curve the flexible neck element.

The tension may be applied manually by a user.

It is thus a feature of at least one embodiment of the invention to allow the neck curvature to be actuated by the user by pulling a string and without including electronic components.

The tension may be applied by a servo-motor receiving the tension band to apply tension to the cable to controllably curve the flexible neck element.

It is thus a feature of at least one embodiment of the invention to allow the curvature of the in neck to be actuated by a motor controlled by the user. The movements may be preprogrammed or wirelessly remote controlled by the user.

These particular objects and advantages may apply to only some embodiments falling within the claims and thus do not define the scope of the invention.

BRIEF DESCRIPTION OF THE DRAWINGS

FIG. 2 is an exploded perspective view showing a first construction of neck segments along an axis of flexure and having a rotating base;

FIG. 3 is a cross-sectional view of the neck segments of FIG. 2 showing internal springs and external cable guides connecting the neck segments;

FIG. 10 is an electrical block diagram of the elements of the decoy such as may communicate wirelessly with a remote controller such as a cell phone.

DETAILED DESCRIPTION OF THE PREFERRED EMBODIMENT

Figure 1:
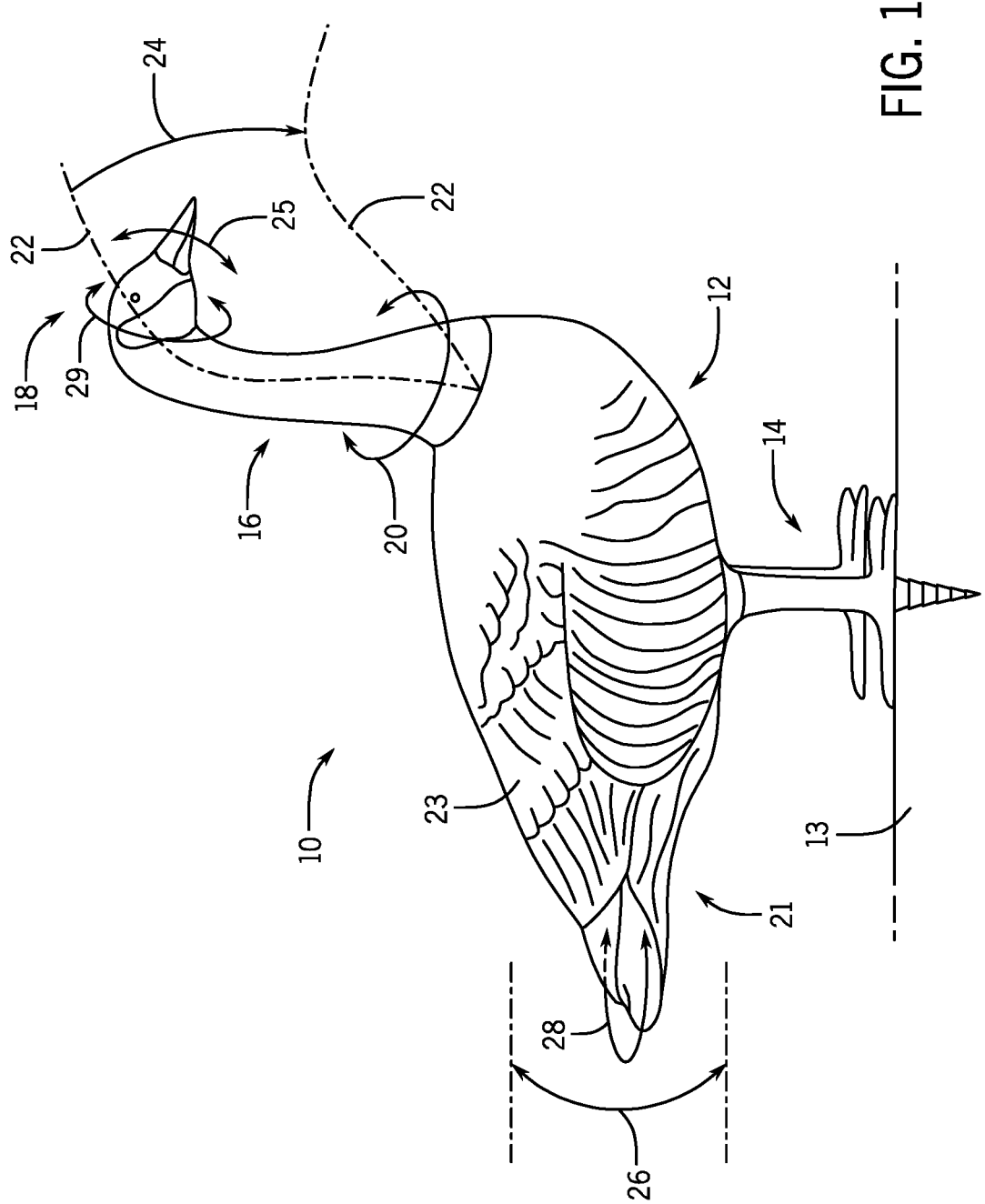
FIG. 1 is a side perspective view of a goose decoy constructed according to the present invention showing various movements of parts of the goose decoy along various axes.

Referring now to FIG. 1, a realistic goose decoy 10 providing life-like movements may include a body section 12 supported above a ground 13 by a leg stand 14 extending downward therefrom and contacting the ground 13. The leg stand 14 may be spiked into the ground in order to support the goose decoy 10 upright and prevent tipping during head and tail movements. The body section 12 supports a neck section 16 attached at the front of the body section 12 extending generally upward and forward therefrom to a head element 18. The body section 12 further supports a tail segment 21 attached at the rear of the body section 12 and extending generally outward and rearward therefrom.

Figure 7:
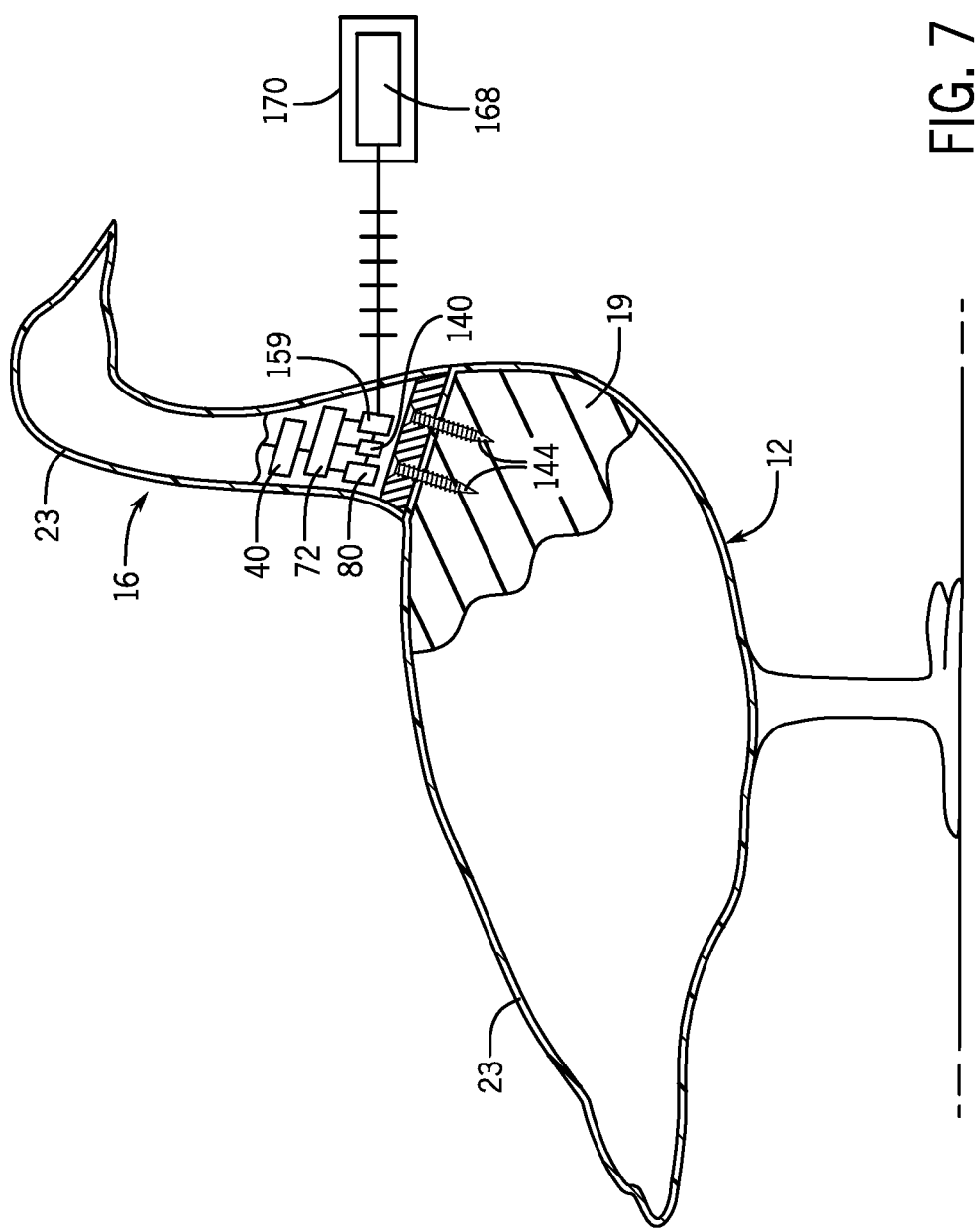
FIG. 7 is a figure similar to that of FIG. 1 also showing a phantom view of the goose decoy with the modular neck unit remotely operated by wireless means.

The body section 12 may be constructed of a plastic, rubber, or foam shell or solid core 19 (as seen in FIG. 7) containing internal frame elements, to be further described below, and covered by a weatherproof and waterproof canvas material that provides a flexible covering 23 over the shell or solid core 19. The shell or solid core 19 provides a generally weighted and inflexible base for the body section 12 which does not need to provide movement. The neck section 16, head element 18, and tail segment 21 may include internal frame elements covered by the flexible covering 23 without the shell 19 to allow for free movement of these parts. The canvas material may be a rubber coated material that is designed to resemble the corresponding design elements of the goose such as plumage and facial features. The leg stand 14 may or may not be covered by the flexible covering 23. The leg stand 14 may be made out of a durable metal material.

Referring also to FIGS. 2 through 7, the internal elements within the flexible covering 23 may provide for movement of the neck section 16 with respect to the body section 12. The neck section 16 may include internal vertebrae segments 40. A swivel joint 50 (seen in FIG. 2) at the base of the vertebrae segments 40 of the neck section 16 may allow the vertebrae segments 40 to swivel or rotate as indicated by direction arrow 20 with respect to the body section 12.

The vertebrae segments 40 may comprise of interlocking segments extending along a neck axis 22 allowing for curvature of the neck section 16 and allow the neck section 16 to bend forward as indicated by direction arrow 24 which provides a curved bending of the neck section 16 and nodding of the head element 18 with respect to the neck section 16 as indicated by direction arrow 25.

The head element 18 may separately swivel or rotate with respect to the neck section 16 as indicated by direction arrow 29 by movement of a head swivel joint 36 (seen in FIG. 6) at the base of the head element 18.

Figure 8:
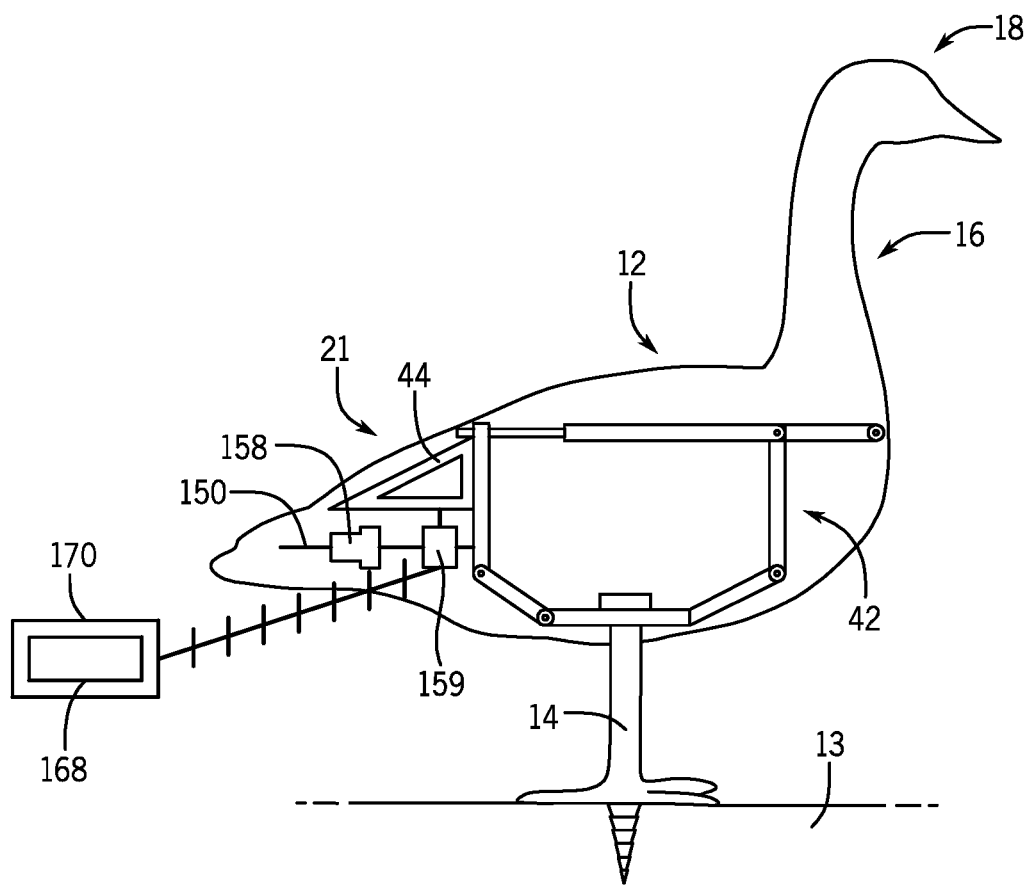
FIG. 8 is a figure similar to that of FIG. 1 showing a phantom view of the goose decoy with a linkage communicating with a tail strut as supported on the body frame that may be operated remotely by wireless means.
Figure 9:
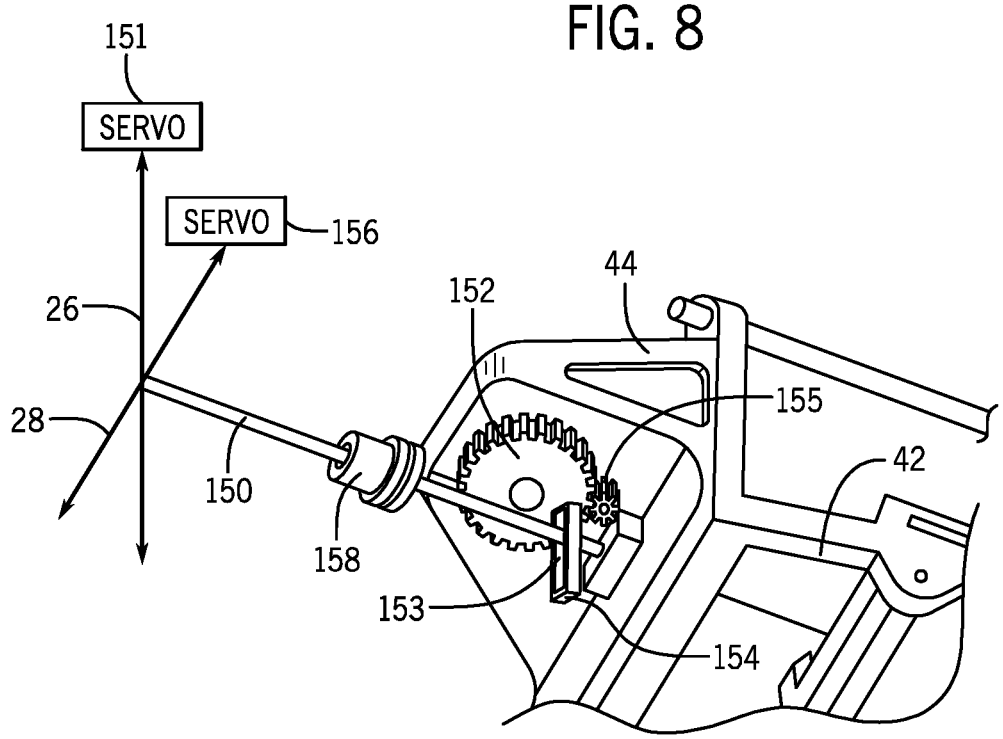
FIG. 9 is an enlarged rear perspective view of the tail servo of FIG. 6 communicating with the tail strut to move the tail strut in horizontal and vertical directions.

Referring now to FIGS. 1, 8 and 9, the internal elements within the shell 19 may provide for movement of the tail segment 21 with respect to the body section 12. The tail segment 21 may be attached to an internal frame structure 42 of the body section 12. The tail segment 21 may include an internal tail frame 44 supporting up-and-down vertical movement as indicated by direction arrow 26 and side-by-side horizontal movement as indicated by direction arrow 28.

As will be further discussed below, the goose decoy 10 may provide for a range of different servo-motor controlled motions. As will be understood in the art, servo-motors provide for position control of an actuation shaft attached to the motor, the position control obtained through the use of an internal or external feedback loop comprising a position sensor such as a potentiometer and a DC permanent magnet gear motor or the like.

Neck Section—First Embodiment

Referring to FIG. 2, the vertebrae segments 40 of the neck section 16 may be injection molded from a thermoplastic polymer for simplicity and manufacture. In this regard various styles of vertebrae segments 40 may be constructed including a top vertebrae segment 40a that may be attached to the head swivel joint 36 (shown in FIG. 6) or directly to a head element 18, five to seven intermediate vertebrae segments 40 (40b and 40c as shown), and a base vertebrae segment 40d that may attach to a swivel or rotating platform 50 as will be discussed below.

Referring also to FIG. 3, each of the vertebrae segments 40 except for the base vertebrae segment 40d may have two downwardly extending interconnection tabs 52 on opposite sides of the lower end of the vertebrae segment 40 having outwardly extending pins 54 coaxial along a horizontal axis 56 and generally perpendicular to the neck axis 22. These pins 54 fit within corresponding bore holes 58 also positioned along a common axis 60 on opposite sides of the upper end of the vertebrae segment 40 (except for the upper vertebrae segment 40a) by a snap fit allowing simple interconnection of the vertebrae segments 40. In this interconnection, axes 56 and 60 are aligned and form a hinge axis between the vertebrae segments 40. A front upper edge of each vertebrae segment 40 (except for the upper vertebrae segment 40a) may include a chamfer 62 allowing the segments to hinge with respect to each other forward by at least 20 degrees or about 45 degrees.

Vertebrae segments 40 have a generally central opening to provide an inner rear wall holding spring mounting pegs 64 whose operation will be described below. A front outer surface of each vertebrae segment 40 also supports outwardly extending cable guides, pilot or eyelet 66 that may receive a cable 68 extending therethrough with one end of the cable attached fixedly to the eyelet 66 on the upper segment 40a and then the cable 68 passing through each of the eyelets 66 loosely to be received in one embodiment by a servo driven wheel 70 that may rotate to pull downward on the cable 68 causing the segments to pivot forward with respect to a vertical axis.

Referring also to FIG. 3, helical compression cables 69 may bridge adjacent pairs of vertebrae segments 40 connected between spring mounting pegs 64 that serve to cause the vertebrae segments 40 to extend vertically absent force by the cable 68. It will be appreciated that pulling down of the cable 68 causes equal pivoting of each vertebrae segment 40 if the spring forces of compression cables 69 are substantially equal and may be tailored to provide an even bending simply by adjusting the cable forces.

Referring again to FIG. 2, the bottom vertebrae segment 40d attaches to a rotating platform 50 holding a DC or servo motor 72 that may drive the servo driven wheel 70 to affect the bending of the neck section 16. The rotating platform may include a turntable 74 rotating about axis 22 with respect to the body section 12 to rotate the vertebrae segments 40. In this regard the outer edge of the turntable 74 may include gear teeth 76 engaging a motor driven gear 78 and a servo motor 80 or the like.

Neck Section—Second Embodiment

Figure 4:
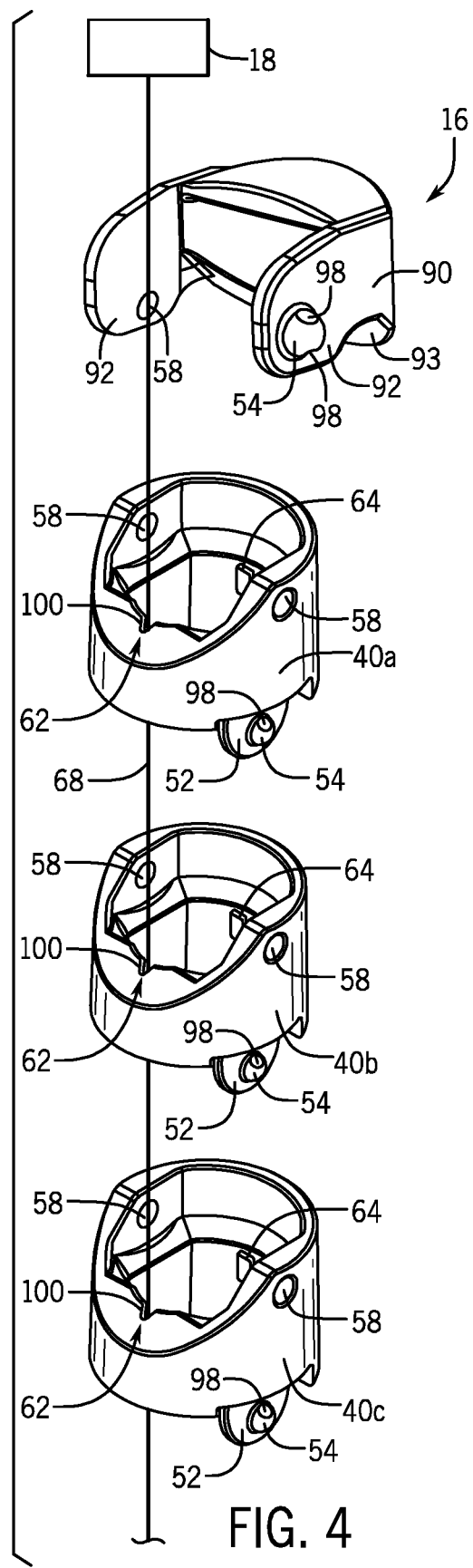
FIG. 4 is an exploded perspective view of a second construction of the neck segments showing the neck segments connected by an internal cable.
Figure 5:
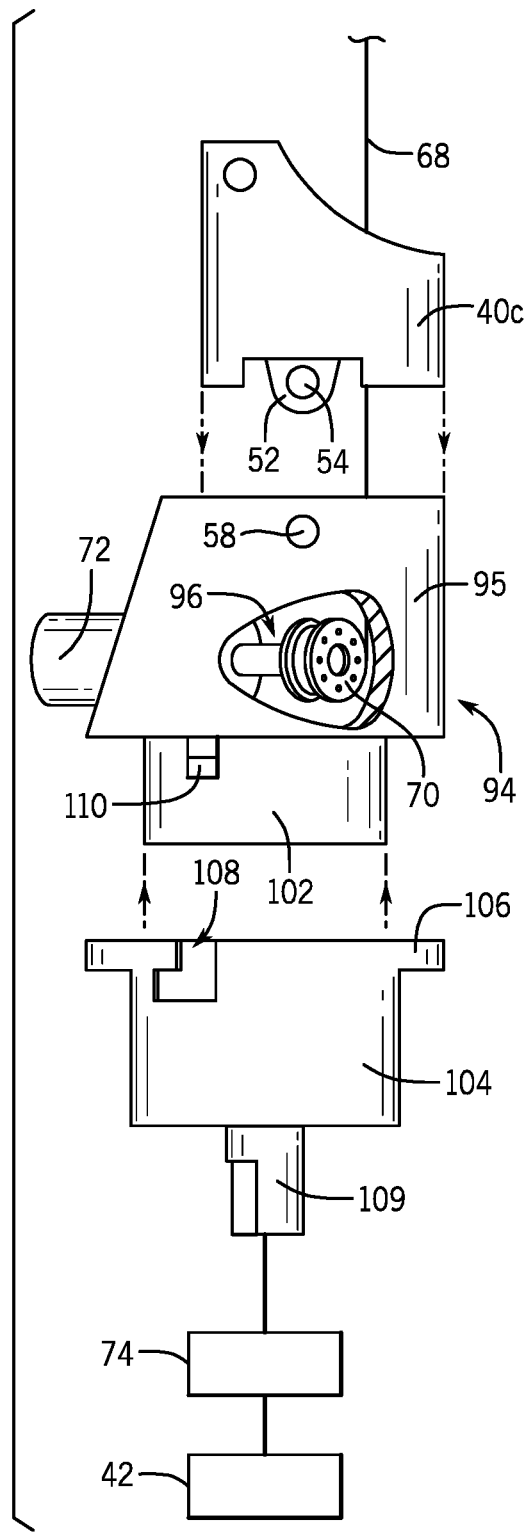
FIG. 5 is an exploded perspective view of the second construction of the neck segments showing the bottommost neck segment attached to a modified base and covered by a sleeve.

Referring to FIGS. 4 and 5, in an alternative embodiment, the vertebrae segments 40 of the neck section 16 may be as substantially shown in FIGS. 2 and 3 with various modifications applied to the vertebrae segments 40 as further explained below.

Similar to above, the vertebrae segments 40 may be injection molded from a thermoplastic polymer for simplicity and manufacture. In this regard, a select number of vertebrae segments 40, for example, 7 to 9 vertebrae segments (40a, 40b, 40c are shown) may span between a head connector 90 connected to be a head segment 18 and a base connector 94 connecting the bottommost vertebrae segment 40c to a motor assembly 96 therein.

Each of the intermediate vertebrae segments 40a, 40b, 40c, may include two downwardly extending interconnection tabs 52 on opposite sides of the lower end of the vertebrae segment 40 with outwardly extending pins 54. Pins 54 fit within corresponding bore holes 58 by a snap fit as previously described above.

Each pin 54 may be a semi-spherical projection having a downwardly slanted cutaway 98 forming a downwardly extending sloping surface at a top of the pin 54. A second upwardly slanted cutaway 98 may be made to a bottom of the pin 54 to form an upwardly extending sloping surface at a bottom of the pin 54. Each cutaway 98 may be at an approximately 30° angle from vertical to facilitate snapping the pin 54 into the bore holes 58.

A front upper edge of each vertebrae segment 40 may include a chamfer 62 allowing the segments to hinge with respect to each other forward by at least 20 degrees or about 45 degrees. An upper inner edge of each chamfer 62 may include a V-shaped notch 100 that may receive a cable 68 loosely slidable therein to be received in one embodiment by a servo driven wheel 70 that may rotate to pull downward on the cable 68 causing the segments to pivot forward with respect to a vertical axis. The cable 68 runs internal to each vertebrae segment 40 as seen in FIG. 2 to be protected by external friction caused by, for example, the flexible covering 23 contacting the outside of the vertebrae segment 40.

The vertebrae segments 40 may have a generally central opening to provide an inner rear wall holding spring mounting pegs 64 and holding helical compression cables 69 as previously described above to cause the vertebrae segments 40 to extend vertically absent force by the cable 68.

The uppermost vertebrae segment 40a attaches to the head connector 90 having two outwardly extending tabs 92 on opposite sides of the head connector 90 and having bore holes 58 positioned on opposite sides of the upper end of the head connector 90 receiving the pins 54 of the uppermost vertebrae segment 40a. The head connector 90 may include its own outwardly extending pins 54 corresponding with bore holes of the head segment 18 connected by a snap fit to allow interconnection of the head connector 90 with the head segment 18. The outwardly extending pins 54 of the head connector 90 may also include cutaways 98 as described above.

A rear upper edge of the head connector 90 may include a chamfer 93 allowing the head connector 90 to hinge with respect to the uppermost vertebrae segment 40a by about 45°. The chamfer 93 may allow the head segment 18 to stay level but also allows the head segment 18 to be perpendicular to the ground 13 when the neck section 16 is in the feeding position.

Referring to FIG. 5, the bottommost vertebrae segment 40c attaches to the base connector 94 having a housing 95 with corresponding bore holes 58 on an inner surface receiving the outwardly extending pins 54 of the bottommost vertebrae segment 40c. The housing 95 includes a central opening holding the motor assembly 96 therein.

The motor assembly 96 may provide a pulley system to allow the vertebrae segments 40 to bend along the neck axes 22. The motor assembly 96 may include a servo driven wheel 70 receiving the cable 68 through the central opening of the housing 95 and winding and unwinding the cable 68 to affect the bending of the neck section 16 and may be driven by a DC or AC servo motor 72 extending outwardly through a side opening of the housing 95. The servo driven wheel 70 may also extend partially through another side opening of the housing 95.

The base connector 94 may further include a lower cylindrical plug 102 extending downwardly from the housing 95 and having a diameter less than a diameter of the housing 95 to be received within a cylindrical collar 104.

The cylindrical collar 104 provides a cylindrical housing that fastens the vertebrae segments 40 to the goose internal frame structure 42 of the body section 12. An upper flange 106 of the cylindrical collar 104 abuts the bottom of the housing 95 of base connector 94. The sidewall of the cylindrical collar 104 includes an L-shaped opening 108 for receiving a rectangular tab 110 on the outer surface of the cylindrical plug 102. The rectangular tab 110 when inserted into the L-shaped opening 108 and rotated, locks the base connector 94 to the cylindrical collar 104.

A rotation shaft 109 extends downwardly from a floor of the cylindrical collar 104. The downwardly extending rotation shaft 109 may be keyed to couple the base connector 94 to a turntable 74 to facilitate rotation. The base connector 94 may communicate with a turntable 74 such as the one shown in FIG. 2 allowing the vertebrae segments 40 to swivel or rotate as described above.

Manual Neck Movement

Figure 6:
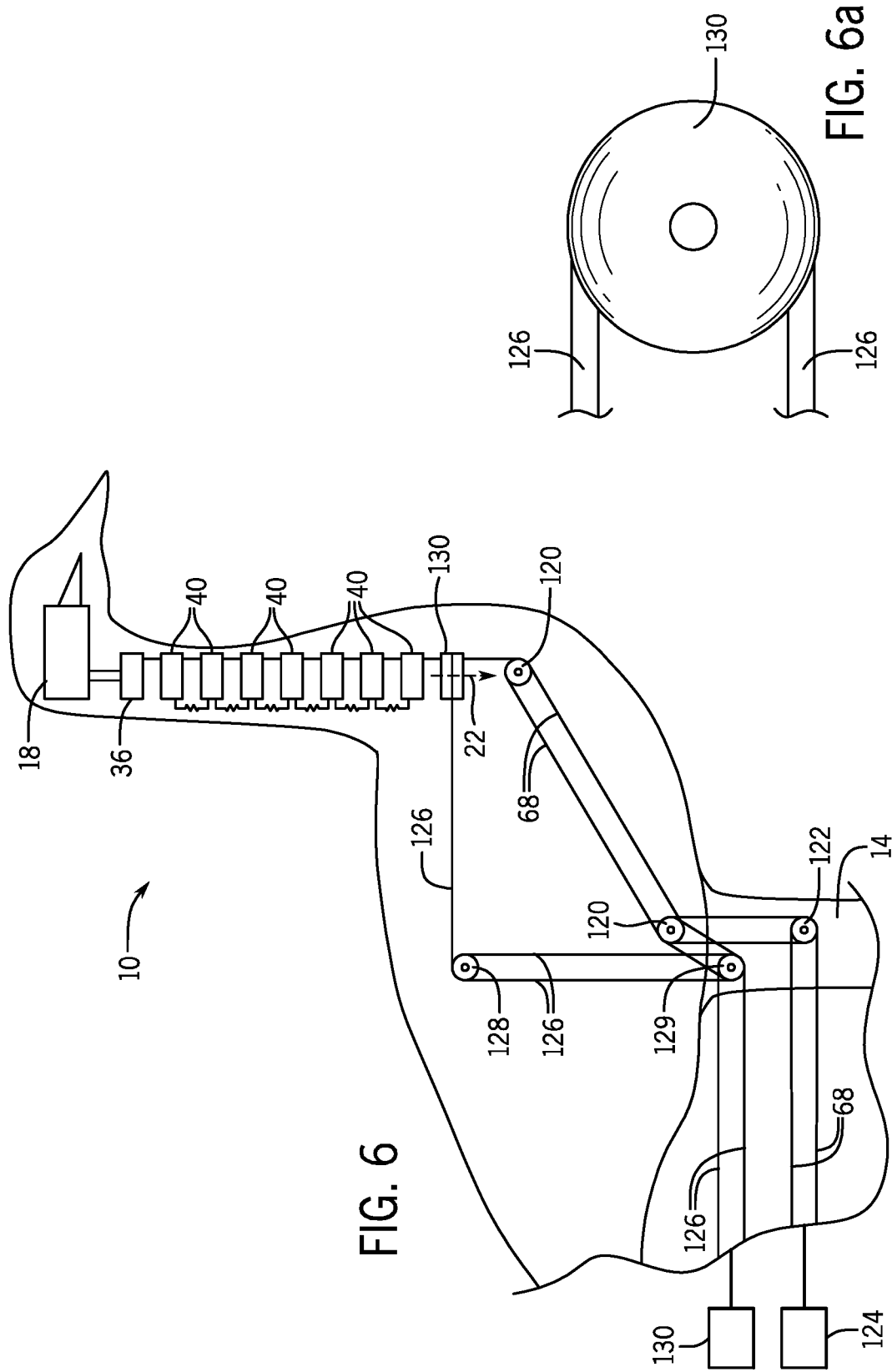
FIG. 6 is a figure similar to that of FIG. 1 showing a phantom view of the goose decoy with the cables manipulated by a user from a remote location and FIG. 6*a* showing as an inset a top plan view of the rotatable disk base.

Referring now to FIG. 6, in one embodiment of the present invention, the cable 68 through the vertebrae segments 40 may be received by a set of pulleys 120 guiding the cable 68 to a distribution pulley 122 outside of the outer covering 23, such as attached to a side of the leg stand 14 of the decoy 10. The cable 68 may extend to a remote location, for example, a hunting blind, and attached to a handle 124 such as a ring or the like that may be pulled by the user to bend the neck section 16 appropriately.

Referring also to FIG. 6a, rotation of the neck about axis 22 may be accomplished by cables 126 received around a horizontally rotating disk to a pulley 128 guiding the cables 126 to a distribution pulley 129 outside of the outer covering 23, such as attached to a side of the leg stand 14 of the decoy 10, and the cables 126 extending to a remote location to be received by a handle 130 such as a hand bar that may provide differential force on the cables 126 to rotate the turntable 74.

In this respect the movement of the neck section 16 may be actuated by cables extending to a remote location and operated by a user.

Modular Neck Portion

Referring to FIG. 7, in an alternative embodiment of the present invention, the neck section 16 may be a modular component removably separable from the body section 12 and containing the vertebrae segments 40 actuating servo-motors 72 and 80 as well as carrying lithium ion batteries 140 and a transceiver 142 further discussed below with respect to FIG. 8. The motors and power source providing movement to the neck section 16 may be self-contained within the modular neck section 16.

The bottom of the neck section 16 may include an attachment spike or threaded element 144 to be attached to a variety of different foam shell or solid core 19 materials, for example, made of lightweight foam, Styrofoam, or the like. It is understood that the neck section 16 may be attached to the body section 12 by other means commonly known in the art such as a screw attachment.

In this respect damage to the body section 12 may be addressed by simply moving the neck section 16 to a different body section 12

Tail Section and Movement

Referring to FIGS. 8 and 9, the tail segment 21 may be attached to the internal frame structure 42 of the body section 12. The tail segment 21 may include an internal tail frame structure 44 shaped to resemble the tapering tail portion of a goose body, for example a triangular-shaped frame, and supporting a tail strut 150 extending rearwardly into the posterior tail area and forming part of the tail segment 21. The tail strut 150 is moved with respect to the internal tail frame structure 44 to simulate horizontal and vertical tail movement.

Horizontal motion of the tail segment 21 may be accomplished by a servo motor 151 communicating with the tail strut 150. The servo motor 151 may be fixed to a stationary structure with respect to the internal frame structure and causing rotation of a servo driven wheel 152. The servo driven wheel 152 may be assisted by a drive gear 155 directly actuated by the servo motor 151 to rotate the servo driven wheel 152. Extending downwardly from and fixed to the servo driven wheel 152 is a restrictive plate 154 having a vertical channel 153 receiving the tail strut 150 and restricting movement in the horizontal direction. The restrictive plate 154 is spaced from a center of the wheel 152 such that rotation of the servo driven wheel 152 moves the tail strut 150 in a horizontal direction but not in a vertical direction. As the wheel 152 rotates, the tail strut 150 moves in a horizontal direction as shown by direction arrows 28.

Vertical motion of the tail segment 21 may be accomplished by a separate servo motor 156 communicating with the tail strut 150 to move the tail strut 150 along the vertical channel 153 of the restrictive plate 154 thus allowing movement of the tail strut 150 in a vertical direction as shown by direction arrows 26. In this way, the movement of the tail segment 21 may be flexibly controlled by actuation of the servo-motors 151, 156.

It is understood that in an alternative embodiment, the vertical motion of the tail segment 21 may be linked to the horizontal movement of the tail segment 21 such that only one servo motor may be needed to actuate motion in both horizontal and vertical directions.

The tail strut 150 may include a ball valve 158 to seal the hole made in the flexible covering 23 and used to connect the tail strut 150 to the covering 23. The ball valve 158 permits the hole at the tail to be very small and the sealing of the body to be effective.

Wireless Movement Control System

Referring now to FIG. 10, a microcontroller 159 may communicate with each of the servo-motors 72, 80 of the neck and servo-motors 151, 156 of the tail to provide movement of the neck and tail. The microcontroller 159 may have a processor 160 communicating with a memory 162 holding a stored program 164 as will be described below.

The microcontroller 159 may communicate with a radio transceiver 142 used with a remote control unit 168 of a smart phone 170 or similar device having its own radio transceiver 143, and with transceivers 142 of other goose decoys 10. The microcontroller 159 may communicate with other goose decoys 10, for example, to provide coordinated motion of other goose decoys 10 such as would be seen in a flock of geese. The body section 12, or neck section 16 with respect to the modular neck section of FIG. 7, of the goose decoy 10 may contain lithium ion batteries 140 to provide power to each of the components.

The program 164 stored within the memory 162 of the processor 160 may receive signals from the remote control unit 168 and translate the signals to provide continuous control of each of the servo-motors 72, 80, 151, 156 for highly accurate and precise manipulation of the neck and tail described above. The program 164 may also hold motion scripts that can produce a list of sequences of motion that occur automatically according to a time schedule and may repeat as desired.

The start of the program 164 or activation of motions may be activated by the user using the remote control unit 168, for example, to elevate the head element 18 and move the tail elements. The user may activate a list of sequences or motion scripts or individual movements as desired.

It is understood that the goose decoy 10 may have limited functionality depending on the installed mechanisms of the goose decoy 10 that may be required for program execution. For example, some goose decoys 10 may provide for only tail articulation and some decoys may provide for only neck articulation. In this regard each of the goose decoys 10 may be modular to allow additional mechanical structures to be added to the decoys after purchase, for example, to improve their functionality.

It will be appreciated that the present invention is not limited to geese but may be applied to all animal decoys used for hunting wildfowl. The invention may be used to construct decoys for any type of game bird including geese, ducks and other birds such as cranes and swans.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A game bird decoy comprising:
a body element having a flexible neck element extending therefrom, the body element and flexible neck element sized and anatomically decorated to resemble a bird, wherein the flexible neck element includes a stack of inter-engaging neck segments extending along a neck axis, each of said neck segments pivotally attached to an adjacent neck segment of said stack of inter-engaging neck segments to provide a limited pivoting with respect to the adjacent neck segment to curve forward along the neck axis;
at least one restoring spring urging the neck segments into a resting alignment; and
a tension band attached to each neck segment and extending along the stack of inter-engaging neck segments to follow any curvature of the stack of inter-engaging neck segments;
wherein each neck segment has two outwardly extending pins extending coaxial along an axis generally perpendicular to the neck axis, and
wherein the outwardly extending pins fit within corresponding bore holes positioned along the axis on opposite sides of an upper end of each neck segment by a snap fit allowing simple interconnection of the stack of inter-engaging neck segments.

2. The game bird decoy of claim 1 wherein each neck segment is a single piece thermoplastic element.

3. The game bird decoy of claim 1 wherein each neck segment has downwardly extending interconnection tabs on opposite sides of a lower end of each neck segment.

4. The game bird decoy of claim 1 wherein each neck segment includes a chamfer at a front upper edge allowing the neck segments to flex from the neck axis by more than 20°.

5. The game bird decoy of claim 4 wherein the flexing is forward with respect to an anatomical decoration.

6. The game bird decoy of claim 1 wherein each neck segment provides a central channel providing a guide for receiving the tension band for sliding therethrough.

7. The game bird decoy of claim 6 wherein the guide is a V-shaped notch on an interior of each neck segment.

8. The game bird decoy of claim 6 wherein the central channel provides attachment points for the at least one restoring spring.

9. The game bird decoy of claim 1 wherein the outwardly extending pin is a semispherical protrusion with at least one slanted cutaway forming at least one of a downwardly extending sloping surface and an upwardly extending sloping surface.

10. The game bird decoy of claim 1 wherein a lower neck segment of the stack of inter-engaging neck segments is supported by a base including a servo-motor receiving the tension band to apply tension to the tension band to controllably curve the flexible neck element.

11. The game bird decoy of claim 10 wherein the base includes a second servo-motor communicating with the lower neck segment to rotate the stack of inter-engaging neck segments about the neck axis.

12. The game bird decoy of claim 1 wherein a tail element extends from the body element and includes a strut extending along a tail axis.

13. The game bird decoy of claim 12 wherein the tail element includes a servo-motor receiving the strut and moving the strut in at least one direction.

14. The game bird decoy of claim 13 wherein the strut moves in at least two perpendicular directions.

15. A flexible neck for a game bird decoy comprising:
a connector half adapted to be received by a corresponding connector half on a game bird decoy body to be removably attached to the game bird decoy body;
a flexible neck element attached to the connector half, the flexible neck element sized and decorated to resemble a bird;
wherein the flexible neck element includes a stack of inter-engaging neck segments extending along a neck axis, each of said neck segments pivotally attached to an adjacent neck segment of said stack of inter-engaging neck segments to provide a limited pivoting with respect to the adjacent neck segment to curve forward along the neck axis,
the flexible neck element including
at least one restoring spring urging the neck segments into a resting alignment;
a cable attached to each neck segment and extending along the stack of inter-engaging neck segments to follow any curvature of the neck segments; and
a servo-motor receiving the tension band to apply a tension to the cable to controllably curve the flexible neck element
wherein each neck segment has two outwardly extending pins extending coaxial along an axis generally perpendicular to the neck axis, and
wherein the outwardly extending pins fit within corresponding bore holes positioned along the axis on opposite sides of an upper end of each neck segment by a snap fit allowing simple interconnection of the stack of inter-engaging neck segments.

16. The flexible neck of claim 15 further comprising:
an electronic computer executing a stored program to control the servo-motor to provide for controlled bending of the neck axis; and
a power supply supplying power to the servo-motor.

17. The game bird decoy of claim 16 wherein the flexible neck element further includes a wireless communication device communicating with the electronic computer for synchronizing operation of the servo-motor of the game bird decoy.

18. A method of using a game bird decoy comprising:
providing a game bird decoy comprising:
- a body element having a flexible neck element extending therefrom, the body element and flexible neck element sized and decorated to resemble a bird, wherein the flexible neck element includes a stack of inter-engaging neck segments extending along a neck axis, each of said neck segments pivotally attached to an adjacent neck segment of said stack of neck segments to provide a limited pivoting with respect to the adjacent neck segment to curve forward along the neck axis;
- at least one restoring spring urging the neck segments into a resting alignment, wherein the resting alignment defines the neck axis;
- a tension band attached to each neck segment and extending along the stack of neck segments to follow any curvature of the stack of neck segments;

wherein each neck segment has two downwardly extending interconnection tabs on opposite sides of a lower end of each neck segment and having outwardly extending pins extending coaxial along an axis generally perpendicular to the neck axis, and wherein the outwardly extending pins fit within corresponding bore holes positioned along the axis on opposite sides of an upper end of each neck segment by a snap fit allowing simple interconnection of the stack of inter-engaging neck segments; and applying a tension to the tension band to controllably curve the flexible neck element.

19. The method of claim 18 wherein the tension is applied manually by a user.

20. The method of claim 18 wherein the tension is applied by a servo-motor receiving the tension band to apply tension to the tension band to controllably curve the flexible neck element.

* * * * *